Figure 1:
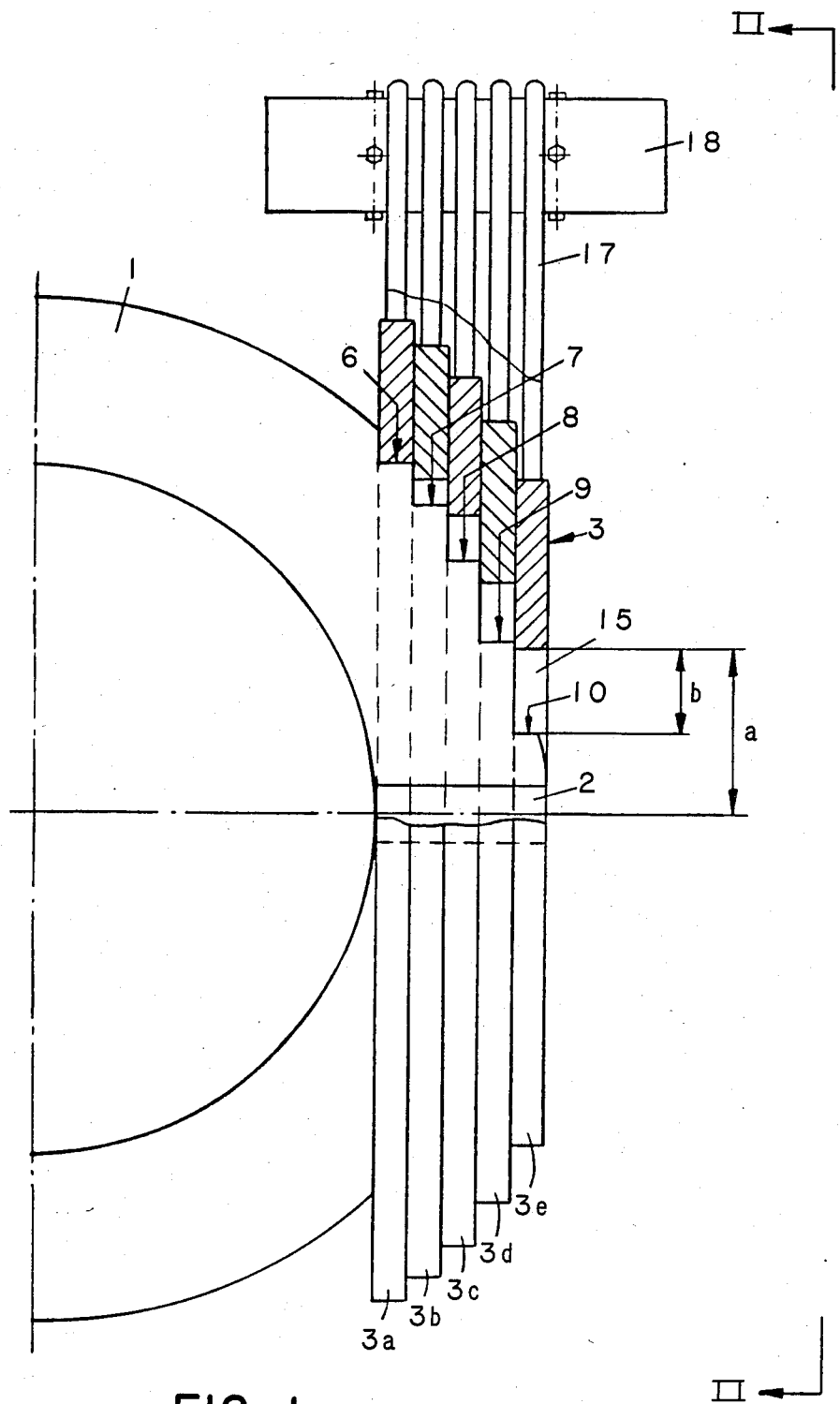

United States Patent [19]

Adolfsson

[11] Patent Number: 4,741,469
[45] Date of Patent: May 3, 1988

[54] CLAMPING RING ATTACHABLE WITH SPLIT CLAMPING MEANS

[75] Inventor: Rune Adolfsson, Boras, Sweden
[73] Assignee: SKF Nova AB, Gothenburg, Sweden
[21] Appl. No.: 76,759
[22] Filed: Jul. 23, 1987
[51] Int. Cl.⁴ .......................... B23K 37/00; B25B 1/08
[52] U.S. Cl. ...................................... 228/50; 24/268; 269/217
[58] Field of Search .......................... 228/50; 269/217; 24/268, 483

[56] References Cited

U.S. PATENT DOCUMENTS 4,412,370 11/1983 Speirs ..................................... 24/268
4,669,911 6/1987 Lundgren et al. ................. 24/268 X

FOREIGN PATENT DOCUMENTS 2443041 6/1975 Fed. Rep. of Germany ...... 269/217

Primary Examiner—Kenneth J. Ramsey
Attorney, Agent, or Firm—Eugene E. Renz, Jr.

[57] ABSTRACT

A clamping ring, intended to enclose and exert a clamping force against a cylindric element and incorporating a slot and a clamping means enclosing the slot, is provided with stepladder-shaped surface elements on each side of the slot, for making possible a compact design and favorable force absorption in the clamping means, whereby the clamping means is composed by several separate sections, enclosing one step each.

3 Claims, 2 Drawing Sheets

CLAMPING RING ATTACHABLE WITH SPLIT CLAMPING MEANS

The invention refers to a clamping ring of the type defined in the preamble of Claim 1.

Such a ring is intended to enclose a cylindric element and is useful, e.g. for attaching an object to the cylindric element or as a support or protection for this, e.g. at explosion welding of tubes with an internal annular explosive charge and an external jointing sleeve where a removable supporting ring outside the charge and the sleeve at the moment of the explosion is required. The supporting ring is preferably split for allowing its mounting and dismounting over a tube. It, furthermore, must be rigid and strong in order to take up the big stresses generated at the explosion thus that the dimensions of the resulting welded joint can be predetermined.

It is earlier known, e.g. by Swedish published patent application 8405144-0, to arrange a ring with a slot and flanges extending radially from the ring and circumscribing the slot, which flanges are enclosed by an annular clamping means displaceable in the axial direction of the clamping ring and are made in one piece. The flanges as well as the clamping ring in such an arrangement must be rather coarse, which is cost increasing and space requiring.

The purpose of the present invention is to provide a clamping ring of the type mentioned in the preamble which incorporates clamping means taking up the force in the best possible manner and which requires a minimum of space. This is according to the invention achieved in that the clamping ring has the features defined in Claim 1.

Such a clamping ring can be manufactured from high strength steel by forging. No projecting flanges need to be dimensioned for taking up bending moments and shearing strains. The clamping ring can be made from comparatively thin sheet metal, which gives a better security against crack extension than if the clamping means were solid.

Figure 2:
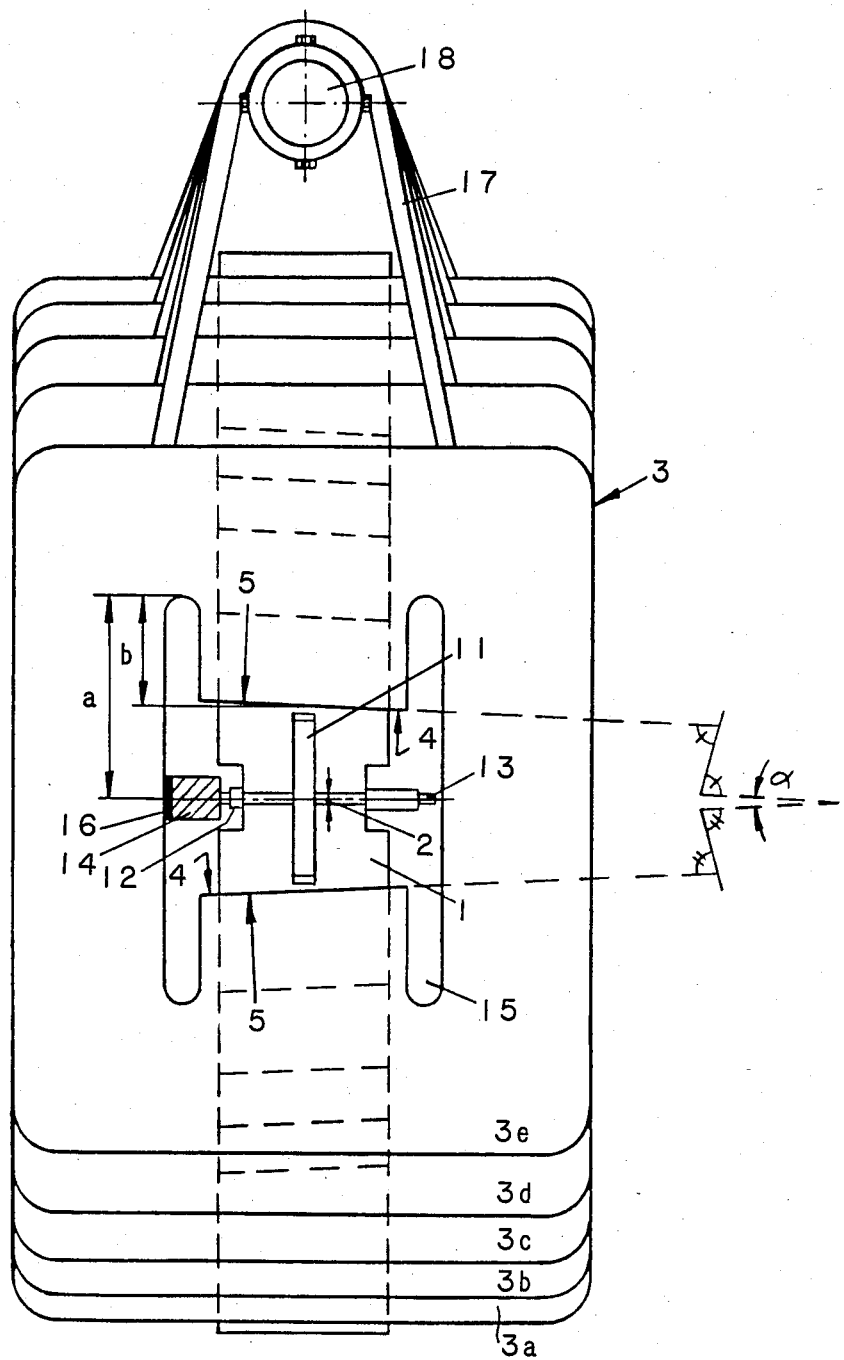

The invention hereinafter will be further described with reference to the accompanying drawing, in which:

FIG. 1 shows an end view with the clamping means partially in cross-section; and FIG. 2 shows a side view along line II—II in FIG. 1 through a clamping ring according to an embodiment of the invention.

The clamping ring incorporates one or more portions 1 formed, e.g. as two ring halves, which connect to each other at two diametrically opposed slots, only one of which is shown at 2 in the drawing. The slot is enclosed by a clamping means 3, displaceable in the axial direction of the clamping ring and having surfaces 4, which cooperate with corresponding surfaces 5 on the clamping ring. The surfaces are provided on each side of the slot 2 and their intersections with a plane transversally through the slot and parallel with the axis of the clamping ring, i.e. the plane of FIG. 2, form lines which form an angle to each other. The slot 2 and thereby the circumference of the entire portion 1 thereby will tend to become smaller when the clamping means is displaced to the left in FIG. 2 due to the wedge effect in the contact between the surfaces 4 and 5. The clamping ring thus can be clamped with an element enclosed by itself by displacement of the clamping means 1.

According to the invention, the clamping means 3 incorporates several separate sections 3a–3e. These enclose one step 6–10 each of the stepladder-shaped portion of the clamping ring. Corresponding steps are provided on the clamping ring upon the other side of the slot. The steps form the abovementioned clamping surfaces and thus are arranged angled thus that a wedging effect shall occur at the different steps with the different sections of the clamping means 3, when the clamping means is displaced.

The displacement can be brought about with different means. A screw device can, e.g. be used, which device incorporates a nut 11 non-turnably provided in a recess in the clamping ring on both sides of the slot 2, which nut cooperates with an axially displaceable screw 12, the ends 13 of which are adapted for cooperation with, e.g. a spanner. The screw can be tightened against an element 14 formed on a rod engaging all sections 3a–3e of the clamping means, which rod, at tightening, displaces the sections to clamping against the associated clamping surfaces on the clamping ring.

When needed, this device can be used at dismantling the clamping ring, whereby the element 14 is provided at the opposite end of the screw 12, thus that the screw device by the sections is pressed away from the clamping surface when tightened.

Due to the fact that the clamping surfaces are located within the cylindrical surface encircling the portions 1 of the clamping ring, these portions can be made from solid blanks, e.g. rings or tubes. The clamping forces, furthermore, act straight over the slot 2 in an area where the forces can be transferred tangentially to the portion 1, i.e. without any bending moments occurring. In earlier known devices where the clamping means enclose flanges projecting from the clamping ring, these flanges are subjected to big shear and bending stresses as the forces are transferred in radial direction in the flanges, whereas the ring portions 1 take up tangential forces.

It is appropriate that the device is such that all sections 3a–3e are designed thus that they exert clamping force of the same size at the same displacement. As the sections are of different sizes, there are required particular arrangements in order to provide this. A possible method is to make the angle of different sizes in the different steps. Another method is to make recesses 15 of different sizes in the different sections, thus that the over-all length of the parts of the sections, which at the clamping are subjected to pulling or pushing forces only, are alike in all sections, i.e. the size a+b is equal, and to make the cross sectional surfaces of the different parts of the same size in all sections. The spring constant thereby will be like in the portions subjected to pulling and pushing forces in all sections.

In order to achieve a force equalization between the element 14 and the different sections 3a–3e it is possible to provide the element 14 with an elastic compensating layer 16.

The handling of the clamping means is simplified if all sections are provided with e.g. carrying loops 17, which enclose a rod 18 or the like.

What is claimed is:

1. A clamping ring with adjustable bore circumference and having at least one slot (2) between two ring portions, which slot is encircled by a clamping means (3) displaceable in the axis direction of the clamping ring and having surfaces (4), which cooperate with corresponding surfaces (5) in the clamping ring, which surfaces are provided on each side of the slot, whereby the intersections of the surfaces with a plane straight through the slot and in parallel with the axis of the clamping ring defines lines which form an angle ($\alpha$) to each other, characterized thereby that the clamping means incorporates several separate sections (3a–3e), which enclose one step of a stepladder-shaped portion of the clamping ring on each side of the slot (2), whereby the steps constitute said surfaces and means (11–14) being arranged for displacement of all sections along the associated surfaces.

2. A clamping ring according to claim 1, characterized thereby that said means incorporate a screw device which cooperates with a member (14) engaging all sections, said member at tightening of the screw device displacing the sections to clamping position against the associated clamping surfaces on the clamping ring.

3. A clamping ring according to claim 2, characterized thereby that the overall length of the parts of the sections, which at clamping are subjected only to pulling forces and the parts which are subjected only to pushing forces is constant and that the cross-sectinal surfaces of the parts are equally big in all sections.

* * * * *